Nov. 29, 1955 N. J. NEMESIO 2,725,179
CONTAINER HANDLE STRUCTURE
Filed Dec. 18, 1953
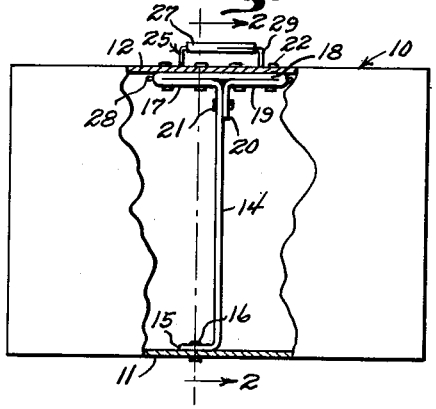
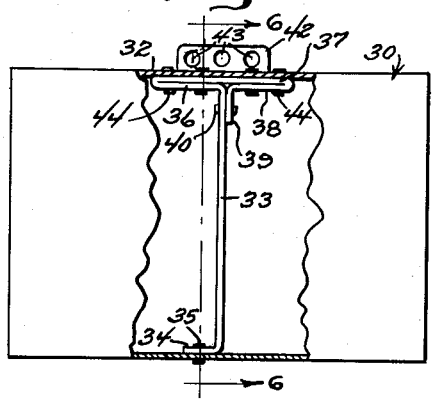
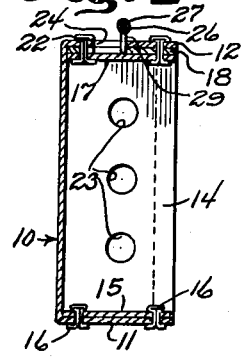
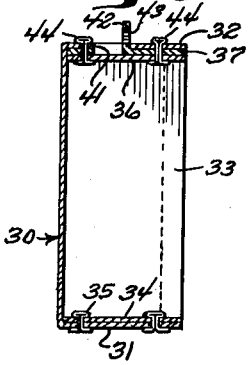
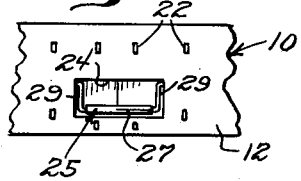
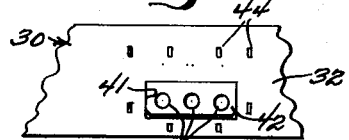
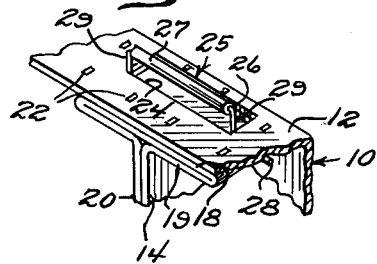
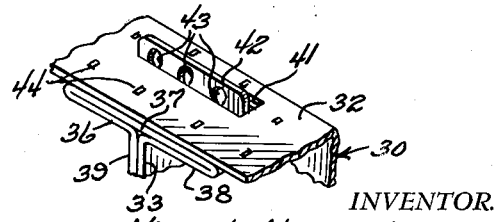
INVENTOR.
Nino J. Nemesio
BY Victor J. Evans & Co.
ATTORNEYS 2,725,179

CONTAINER HANDLE STRUCTURE

Nino J. Nemesio, Sioux City, Iowa

Application December 18, 1953, Serial No. 398,943

1 Claim. (Cl. 229—52)

This invention relates to a container, such as a container for fruit, vegetables, beverages and the like, and more particularly to a handle for such a container.

This invention is an improvement over the bottle and can container and carrier, shown in my co-pending application, Serial No. 328,275, now Patent No. 2,693,296.

The object of the invention is to provide a container having a handle construction which will facilitate the carrying of the container, the handle adapted to be folded into an out-of-the-way position when it is not being used.

Another object of the invention is to provide a handle construction which is rugged so that it will not accidentally work loose during use, the handle lying in a flush position with respect to the wall of the container when it is not being used so that there will be no projecting members to become entangled with objects and the like.

A further object of the invention is to provide a container which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view of a container with the handle construction of the present invention, and with parts broken away and in section.

Figure 2 is a sectional view taken on the line 2—2 of Figure 1.

Figure 3 is a fragmentary top plan view of the container showing the handle in folded out-of-the-way position, as when it is not being used.

Figure 4 is a fragmentary perspective view showing the handle in raised position.

Figure 5 is a side elevational view of a container with a modified handle construction, and with parts broken away and in section.

Figure 6 is a sectional view taken on the line 6—6 of Figure 5.

Figure 7 is a fragmentary top plan view showing the modified handle of Figure 5 in out-of-the-way position when it is not being used.

Figure 8 is a fragmentary perspective view showing the handle of Figure 5 in raised operative position.

Referring in detail to Figures 1 through 4 of the drawings, the numeral 10 designates a container which may be a container for fruits, vegetables, beverages or the like, and the container 10 is composed of a plurality of walls. Two of the opposed walls are indicated by the numerals 11 and 12. Extending transversely through the container 10 is a partition 14 which can be made of any suitable material, and a flange 15 is arranged at right angles with respect to the partition 14. The flange 15 may be secured to the inner surface of the wall 11 in any suitable manner, as for example by means of staples 16.

Extending at right angles with respect to the other end of the partition 14 is a straight portion 17, and extending from the straight or sheet-like planar portion 17 is a body portion 18. The body portion 18 terminates in a flat or folded under portion 19, and the flat portion 19 terminates in a transverse lip 20. The lip 20 is adapted to be secured to the main portion of the partition 14 in any suitable manner, as for example by staples 21. Staples 22 can be used for securing the portions 17, 18 and 19 to the wall 12, Figure 1.

Partition 14 defines in the container 10 a pair of compartments and these compartments may be used for holding different types of fruit or other items, and the partition 14 may be provided with openings 23 whereby air can readily circulate therethrough. The top wall 12 of the housing or container 10 is provided with a cutout 24 in which is pivotally mounted a handle that includes a bracket 25 that can be made of any suitable material such as wire. The bracket 25 includes a web or crosspiece 26, a pair of spaced parallel legs 29, and a hand grip 27 which is mounted on the web 26. The ends of the legs 29 terminate in fingers 28 which are pivotally mounted whereby the hand grip 27 can be moved to and from the position shown in Figures 3 and 4 when the handle is to be used or when it is to be arranged in inoperative position. Thus, when the handle is to be used, the fingers can be readily inserted in the cutout 24 whereby the handle can be moved by pivoting the handle to the position shown in Figure 4 whereby the hand can be readily arranged in engagement with the hand grip 27. When the handle is not being used it can be readily pivoted from the position shown in Figure 4 to the position shown in Figure 3 so that it will be in an out-of-the-way position.

Referring to Figures 5 through 8 of the drawings there is shown a slightly modified construction wherein there is provided a container or housing 30 having opposed walls 31 and 32. A partition 33 extends transversely through the container 30, and the partition 33 includes a transverse flange 34 that is secured to the inner surface of the wall 31 in any suitable manner, as for example by staples 35. A straight or sheet-like planar portion 36 extends from the other end of the partition 33, and the straight portion 36 terminates in a body portion 37 that is arranged contiguous to the inner surface of the wall 32. The body portion 37 terminates in a flat or folded under portion 38, and the flat portion 38 terminates in a transverse lip 39 which is secured to the partition 33 in any suitable manner, as for example by staples 40. The wall 32 of the container is provided with a cutout 41, and a handle 42 is pivotally mounted in the cutout 41. The handle 42 is provided with a plurality of finger engaging recesses 43, Figure 8. The handle 42 may be die cut from the body portion 37, and the handle 42 extends upwardly or outwardly through the opening 41. When the handle 42 is being used it can be moved to the position shown in Figures 5, 6 and 8, so that the fingers can be readily arranged in engagement with the openings 43. When the handle 42 is not being used it can be moved to the position shown in Figure 7 so that it will remain in an out-of-the-way position.

From the foregoing it is apparent that there has been provided a container and handle which is an improvement over the container shown and described in my co-pending application, Serial No. 328,275. The handles can be moved to the positions shown in Figures 3 or 7 when the handles are not being used so that they are less likely to pop open due to vibration or jarring in shipping or in transportation thereof. A suitable means such as the staples 44 can be used for securing the parts 36, 37 and 38 to the wall 32. Instead of using staples for securing the various parts together, stitching or adhesive can be used and the support and handle of the present invention is economical and of great strength. Also, it is to be understood that the present invention is not to be restricted to any particular type of container, but can be used in various types of containers as for example in containers for fruit, vegetables, canned beer and the like.

I claim:

In a container, a bottom and top wall arranged in spaced parallel relation with respect to each other, a medial partition extending transversely through said container between said top and bottom wall and having a transverse flange on its lower end secured to the inner surface of said bottom wall, the upper end of said partition terminating in an integral T-shaped folded portion, said T-shaped portion being secured to the inner surface of the top wall; there being an elongated, handle receiving, cutout in the top wall transversely positioned and medially aligned with respect to said partition; a handle pivotally carried by said T-shaped portion, and swingable from an inoperative position within said cutout to an operative position projecting through said cutout.

References Cited in the file of this patent

UNITED STATES PATENTS

| | | |
|---|---|---|
| 1,949,986 | Whalley | Mar. 6, 1934 |
| 2,298,191 | Boh | Oct. 6, 1942 |
| 2,312,507 | Trogman | Mar. 2, 1943 |

FOREIGN PATENTS

| | | |
|---|---|---|
| 542,768 | Great Britain | Jan. 27, 1942 |
| 545,370 | Great Britain | May 21, 1942 |